United States Patent
Georgeson et al.

(10) Patent No.: US 11,249,040 B2
(45) Date of Patent: Feb. 15, 2022

(54) SYSTEMS AND METHODS OF MONITORING A THERMAL PROTECTION SYSTEM

(71) Applicant: THE BOEING COMPANY, Chicago, IL (US)

(72) Inventors: Gary Georgeson, Tacoma, WA (US); Morteza Safai, Newcastle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/941,239

(22) Filed: Jul. 28, 2020

(65) Prior Publication Data
US 2020/0355637 A1    Nov. 12, 2020

Related U.S. Application Data

(62) Division of application No. 14/337,622, filed on Jul. 22, 2014, now Pat. No. 10,768,128.

(51) Int. Cl.
*G01N 25/72* (2006.01)
*G01K 11/12* (2021.01)

(52) U.S. Cl.
CPC ............ *G01N 25/72* (2013.01); *G01K 11/12* (2013.01)

(58) Field of Classification Search
CPC combination set(s) only.
See application file for complete search history.

(56) References Cited

U.S. PATENT DOCUMENTS

| | | |
|---|---|---|
| 4,015,465 A | 4/1977 | Scott |
| 4,436,999 A | 3/1984 | Kern |
| 4,492,121 A | 1/1985 | Lehto |
| 4,509,370 A | 4/1985 | Hirschfeld |

(Continued)

FOREIGN PATENT DOCUMENTS

| | | |
|---|---|---|
| EP | 0123225 A1 | 10/1984 |
| JP | H06313738 A | 11/1994 |
| WO | 2014058545 A1 | 4/2014 |

OTHER PUBLICATIONS

PCT Search Report and Written Opinion, dated Dec. 4, 2013 for related Application No. PCT/US2013/057790, 11 pp.

(Continued)

*Primary Examiner* — Lisa M Caputo
*Assistant Examiner* — Nasir U. Ahmed
(74) *Attorney, Agent, or Firm* — Womble Bond Dickinson (US) LLP (57) ABSTRACT

A method of monitoring a thermal protection system coupled to a structural component is provided. The thermal protection system includes a thermally insulative body and at least one layer of thermochromatic material applied thereon such that the at least one layer is positioned between the thermally insulative body and the structural component. The method includes determining a value of a thermochromatic property of the at least one layer of thermochromatic material, wherein the value of the thermochromatic property is responsive to an amount of heat applied to the at least one layer of thermochromatic material, comparing the value to a baseline value of the thermochromatic property, and determining degradation of the thermal protection system when the value of the thermochromatic property deviates from the baseline value.

20 Claims, 5 Drawing Sheets

(56) References Cited

U.S. PATENT DOCUMENTS

| | | | |
|---|---|---|---|
| 4,784,811 A | 11/1988 | Hirschfeld | |
| 4,921,770 A | 5/1990 | Murayama et al. | |
| 5,132,530 A | 7/1992 | Groh et al. | |
| 5,177,805 A | 1/1993 | Groger et al. | |
| 5,300,356 A | 4/1994 | Dempster et al. | |
| 5,330,718 A | 7/1994 | Hui et al. | |
| 5,360,503 A * | 11/1994 | Coffy | F16D 69/026 156/175 |
| 5,438,879 A | 8/1995 | Reda | |
| 5,490,426 A | 2/1996 | Shiga et al. | |
| 5,756,356 A | 5/1998 | Yanagi et al. | |
| 5,817,945 A | 10/1998 | Morris et al. | |
| 5,963,310 A | 10/1999 | Brown et al. | |
| 6,263,736 B1 | 7/2001 | Thundat et al. | |
| 6,311,557 B1 | 11/2001 | Davis et al. | |
| 6,327,030 B1 | 12/2001 | Ifet al. | |
| 6,442,316 B1 | 8/2002 | Rossi et al. | |
| 6,808,804 B2 | 10/2004 | Hotaka et al. | |
| 6,814,916 B2 | 11/2004 | Willden et al. | |
| 7,037,973 B2 | 5/2006 | Botros et al. | |
| 7,118,370 B2 | 10/2006 | Willden et al. | |
| 7,127,950 B2 | 10/2006 | Fonov et al. | |
| 7,246,570 B2 | 7/2007 | Weng et al. | |
| 7,285,313 B2 | 10/2007 | Kim et al. | |
| 7,398,698 B2 | 7/2008 | Griess et al. | |
| 7,514,262 B2 * | 4/2009 | Ribi | G01N 31/229 116/206 |
| 7,651,650 B2 | 1/2010 | Willden et al. | |
| 7,691,435 B2 | 4/2010 | Keller et al. | |
| 7,768,640 B2 | 8/2010 | Cunningham et al. | |
| 7,858,952 B2 | 12/2010 | Feist et al. | |
| 7,862,888 B2 | 1/2011 | Toyama et al. | |
| 8,008,039 B2 | 8/2011 | Jelinek | |
| 8,038,815 B2 | 10/2011 | Bailey et al. | |
| 8,601,694 B2 | 12/2013 | Brennan et al. | |
| 8,720,278 B1 | 5/2014 | Toivola et al. | |
| 8,771,823 B2 | 7/2014 | Levesque et al. | |
| 2006/0216456 A1 | 9/2006 | Gore et al. | |
| 2006/0231981 A1 | 10/2006 | Lee et al. | |
| 2006/0286407 A1 | 12/2006 | Amano et al. | |
| 2008/0063026 A1 * | 3/2008 | Roche | F16B 43/00 374/162 |
| 2008/0136324 A1 | 6/2008 | Bast et al. | |
| 2009/0036304 A1 | 2/2009 | Misner et al. | |
| 2009/0085176 A1 | 4/2009 | Couillard et al. | |
| 2009/0108214 A1 * | 4/2009 | Shinoda | G01N 15/1434 250/492.1 |
| 2009/0111701 A1 * | 4/2009 | Ahn | C40B 60/08 506/7 |
| 2009/0122832 A1 * | 5/2009 | Feist | C23C 4/12 374/161 |
| 2009/0202864 A1 * | 8/2009 | Feist | C23C 28/325 428/690 |
| 2010/0192833 A1 | 8/2010 | Yang et al. | |
| 2010/0227105 A1 | 9/2010 | Dan-Jumbo et al. | |
| 2010/0227106 A1 | 9/2010 | Dan-Jumbo et al. | |
| 2010/0227117 A1 | 9/2010 | Dan-Jumbo et al. | |
| 2010/0276064 A1 | 11/2010 | Blanchard et al. | |
| 2010/0276065 A1 | 11/2010 | Blanchard et al. | |
| 2011/0123712 A1 * | 5/2011 | Becker, IV | C09K 9/02 427/162 |
| 2011/0132523 A1 | 6/2011 | Evens et al. | |
| 2011/0291325 A1 | 12/2011 | Mattia et al. | |
| 2011/0316712 A1 | 12/2011 | Mciver et al. | |
| 2012/0050537 A1 * | 3/2012 | Ringermacher | G01J 5/0896 348/164 |
| 2013/0014690 A1 | 1/2013 | Shirase | |
| 2014/0103585 A1 | 4/2014 | Coxon et al. | |
| 2014/0139904 A1 * | 5/2014 | Hendaoui | G02F 1/21 359/288 |

OTHER PUBLICATIONS

Georgeson et al., "Structural Repair Having Optical Witness and Method of Monitoring Repair Performance," U.S. Appl. No. 13/310,539, filed Dec. 20, 2011, 63 pp.

Cantwell et al., "An Assessment of the Impact Performance of CRFP Reinforced with High-Strain Carbon Fibres," Composite Science and Technology, vol. 25, Issue 2, 1986, pp. 133-148.

Morton et al.; "Impact Response of Tough Carbon Fibre Composites", Composite Structures, vol. 13, Issue 1, 1989, pp. 1-19.

Kumar et al., "Delaminations of Barely Visible Impact Damage in CFRP Laminates," Composite Structures, vol. 23, No. 4., 1993, pp. 33-318.

Poon et al., "Assessment of Impact Damage in Toughened Resin Composites," Theoretical and Applied Fracture Mechanics, vol. 13, Issue 2, 1990, pp. 81-97.

Van Keuren et al., "Three Dimensional Thermal Imaging Using Two-Photon Microscopy," Journal of Physics D., Applied Physics, vol. 37, No. 20, Sep. 2004, pp. 2938-2943.

Drickamer et al., "Two Examples of Pressure Tuning Spectroscopy in Solid Polymeric Media," Industrial and Engineering Chemistry Research, vol. 40, No. 14, Apr. 2001, pp. 3038-3041.

Woo et al., "Solvent Effects on the Two-Photon Absorption of Distyrlbenzene Chromophores," Journal of American Chemical Society, vol. 127, Issue 42, Sep. 2005, pp. 14721-14729.

Birks, "Excimers," Reports on Progress in Physics, vol. 38, No. 8, 1975, pp. 903-974.

Wu et al., "Enhancement of Aggregation-Induced Emission in Dye-Encapsulating Polymeric Micelles for Bioimaging," Advanced Functional Materials, vol. 20, Issue 9, May 2010, pp. 1413-1423.

Luo et al., "Aggregation-Induced Emission of 1-Methyl-1, 2, 3, 4, 5-Pentaphenylsilole," Chemocomm Communication, Aug. 2001, pp. 1740-1741.

Lowe et al., "Oligo (p-phenylene vinylene) Excimers as Molecular Probes: Deformation-Induced Color Changes in Photoluminescent Polymer Blends," Advanced Materials, Nov. 2002, vol. 14, No. 22, 1625-1629.

Yang et al., "Excimer Formation in Uniaxially Stretched Polymer Films," Journal of Applied Polymer Science, vol. 82, Issue 10, Dec. 2001, pp. 2347-2351.

PPG Aerospace, Technical Data, Desoprime CF/CA 7501, Feb. 2010, 2 pages, available online at URL http://www.ppg.com/coatings/aerospace/coatings/coatingsproducts/Documents/Desoprime_CF_CA_7501.pdf last visited Jul. 16, 2014.

PPG Aerospace, Technical Data, Desothane HS Buffable Clear Topcoat CA 8800/B900, Feb. 2010, 2 pages, available online at URL http://www.ppg.com/coatings/aerospace/coatings/coatingsproducts/Documents/Desothane_HS_Buffable_Clear_Topcoat_CA_8800_B900.pdf last visited Jul. 16, 2014.

"Standard Test Method for Assignment of the Glass Transition Temperature by Dynamic Mechanical Analysis," Designation E 1640-04, ASTM International, 5 pages.

Toivola et al., "Stress Sensitive Fluorescent Dyes for Damage Detection in Aerospace Primers & Coatings," SEMPE 2011 Conference and Exhibition Conference Program, Long Beach, CA, May 2011, 17 pages.

* cited by examiner

SYSTEMS AND METHODS OF MONITORING A THERMAL PROTECTION SYSTEM

CROSS-REFERENCE TO RELATED APPLICATION(S)

The present application is a divisional of U.S. application Ser. No. 14/337,622, filed on Jul. 22, 2014, entitled: Systems and Methods of Monitoring a Thermal Protection System, now U.S. Pat. No. 10,768,128, issued Sep. 8, 2020, the content of which is expressly incorporated herein by reference in its entirety.

BACKGROUND

The field of the present disclosure relates generally to thermal protection systems and, more specifically, to using thermochromatic coatings to monitor the structural integrity of thermal protection systems.

Thermal protection systems are generally implemented in the aerospace industry to thermally shield reusable launch vehicles (RLVs) from high temperatures caused by re-entry into Earth's atmosphere, or on certain aircraft in locations downstream from high-temperature engine exhaust, for example. At least some known thermal protection systems are formed from a heat-resistant fabric that facilitates maintaining a temperature of a metallic and/or composite structural of the vehicle below the thermal protection system. At least some known heat-resistant fabrics are fabricated from fiberglass, Nomex®, Kevlar®, and combinations thereof.

While generally effective at thermally shielding structural components of a vehicle, at least some known heat-resistant fabrics have a limited service life. For example, heat-resistant properties of the heat-resistant fabrics may degrade over time resulting in damage to the underlying structural components. At least some known non-destructive examination (NDE) techniques are capable of determining degradation of heat-resistant fabrics. However, such techniques are generally time-consuming and may be unable to detect degradation in the heat-resistant blanket until at least some damage to the underlying structural components has occurred.

BRIEF DESCRIPTION

In one aspect, a method of monitoring a thermal protection system coupled to a structural component is provided. The thermal protection system includes a thermally insulative body and at least one layer of thermochromatic material applied thereon such that the at least one layer is positioned between the thermally insulative body and the structural component. The method includes determining a value of a thermochromatic property of the at least one layer of thermochromatic material, wherein the value of the thermochromatic property is responsive to an amount of heat applied to the at least one layer of thermochromatic material, comparing the value to a baseline value of the thermochromatic property, and determining degradation of the thermal protection system when the value of the thermochromatic property deviates from the baseline value.

In another aspect, a thermal protection system is provided. The system includes a thermally insulative body and at least one layer of thermochromatic material applied to the thermally insulative body. A value of a thermochromatic property of the at least one layer of thermochromatic material is responsive to an amount of heat applied to the at least one layer of thermochromatic material.

In yet another aspect, a system for use in monitoring a thermal protection system is provided. The thermal protection system includes a thermally insulative body and at least one layer of thermochromatic material applied thereon. The system includes at least one module including a substrate coupled to the at least one layer of thermochromatic material, an excitation source coupled to the substrate and configured to direct light towards the at least one layer, and a detection system coupled to the substrate and configured to receive a signal emitted from the at least one layer. The signal includes a value of a thermochromatic property of the at least one layer. A controller is in communication with the at least one module, and is configured to direct the excitation source to selectively direct light towards the at least one layer, and receive the signal from the detection system.

DETAILED DESCRIPTION

The implementations described herein relate to systems and methods of monitoring thermal protection systems. In an exemplary implementation, the thermal protection system is coupled to a structural component and includes a thermally insulative body and at least one layer of thermochromatic material applied to an underside of the thermally insulative body such that the layer is positioned between the thermally insulative body and the structural component. The thermochromatic material is responsive to changes in temperature such that a value of a thermochromatic property of the layer permanently shifts when an excess amount of heat is conducted through the thermally insulative body. More specifically, the value only shifts when the temperature of the layer is greater than a predetermined threshold, which provides a visual indication of potential degradation of the thermal protection system. Also described herein is a micro-opto-electro-mechanical system (MOEMS) capable of detecting shifts in the value while the thermal protection system remains in-situ.

Figure 1:
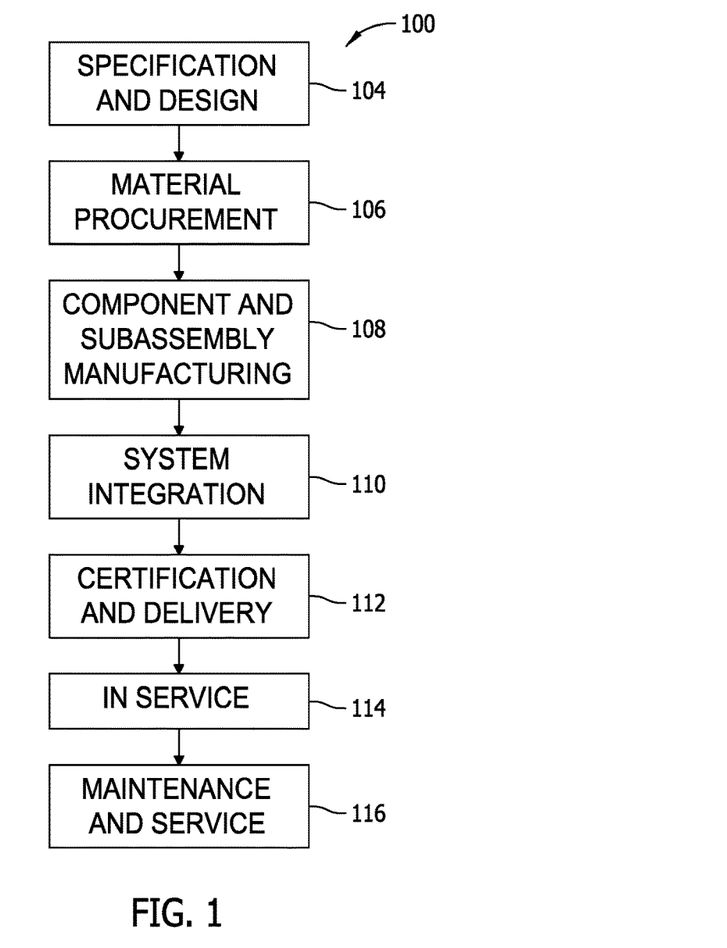
FIG. 1 is a flow diagram of an exemplary aircraft production and service method.
Figure 2:
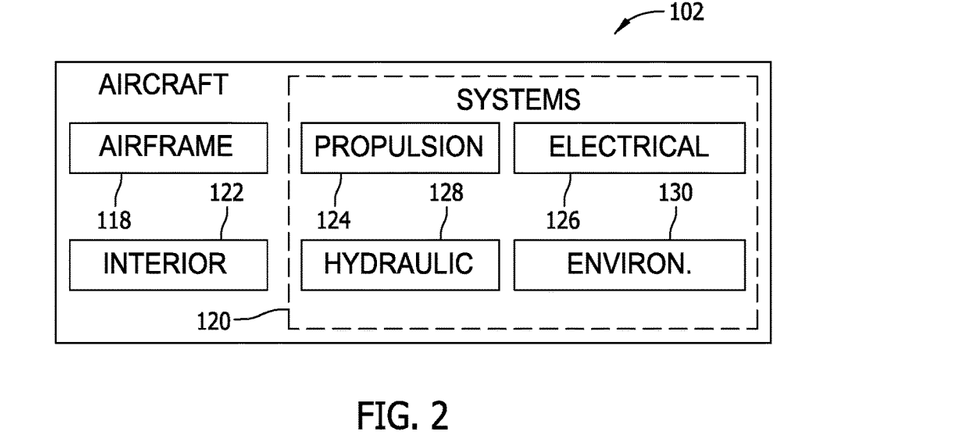
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
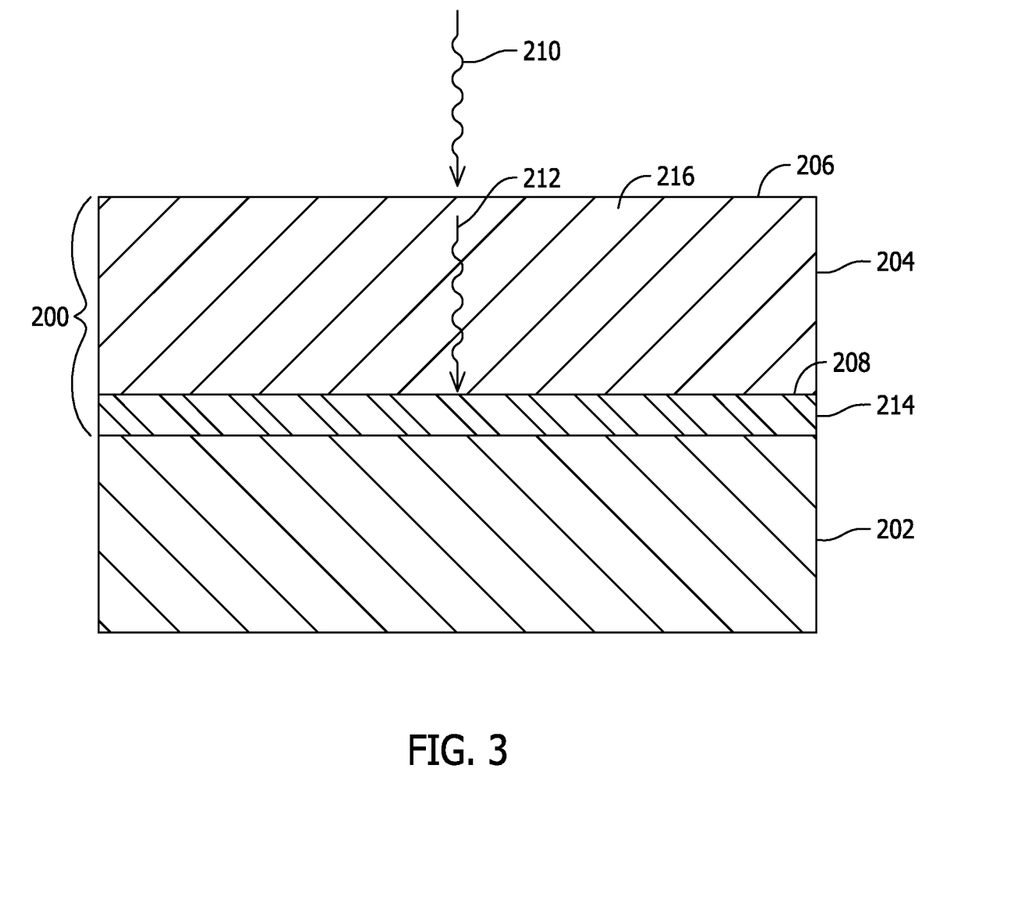
FIG. 3 is a schematic cross-sectional illustration of an exemplary thermal protection system.

FIG. 3 is a schematic cross-sectional illustration of an exemplary thermal protection system 200. In an exemplary implementation, thermal protection system 200 is coupled to a structural component 202 of aircraft 102 (shown in FIG. 2). Thermal protection system 200 includes a thermally insulative body 204 including a first surface 206 and a second surface 208. Thermal protection system 200 facilitates shielding structural component 202 from potential heat damage when structural component 202 and thermal protection system 200 are exposed to a first amount 210 of heat. For example, while thermal protection system 200 may inhibit heat transfer from first surface 206 to second surface 208, some amount of heat (e.g., a second amount 212 of heat) may reach second surface 208. Second amount 212 of heat may be conducted through thermally insulative body 204 from first surface 206. In some implementations, second amount 212 of heat reaches second surface 208 due to gaps in and/or around thermally insulative body 204, and/or displacement or movement of thermally insulative body 204 relative to structural component 202. At least one layer 214 of thermochromatic material is applied to second surface 208 such that layer 214 of thermochromatic material is positioned between thermally insulative body 204 and structural component 202. As will be described in more detail below, layer 214 of thermochromatic material facilitates providing a visual indication of potential heat damage to structural component 202 and/or degradation of thermally insulative body 204, which may be caused by second amount 212 of heat.

Thermally insulative body 204 may be fabricated from any material that enables thermal protection system 200 to function as described herein. For example, in an exemplary implementation, thermally insulative body 204 is a woven or non-woven material formed from a plurality of heat-resistant fibers 216. Exemplary heat-resistant fibers 216 include, but are not limited to, fiberglass, Nomex® fibers, and Kevlar® fibers. ("Nomex" and "Kevlar" are both registered trademarks of E.I. du Pont de Nemours and Company of Wilmington, Del.).

Layer 214 of thermochromatic material may be fabricated from any thermochromatic material that enables thermal protection system 200 to function as described herein. For example, in an exemplary implementation, the thermochromatic material is fabricated from one or more thermochromatic dyes responsive to temperatures above a predetermined threshold. More specifically, a value of a thermochromatic property of the thermochromatic material is responsive to an amount of heat applied to layer 214 of thermochromatic material or that is conducted through thermally insulative body 204. Moreover, in one implementation, the thermochromatic material includes photoluminescent material. As such, the thermochromatic property is only visible to the human eye when activated by non-visible light such that a shift in a value of the thermochromatic property cannot be seen by a casual observer (not shown). Exemplary thermochromatic properties include at least one of an intensity or a frequency of light emitted from layer 214 of thermochromatic material.

In operation, thermal protection system 200 is exposed to first amount 210 of heat, such as heat from a flow of exhaust gas discharged from aircraft 102 (shown in FIG. 2), and thermally insulative body 204 facilitates shielding structural component 202 from the heat. However, thermally insulative body 204 may degrade during the service life of aircraft 102 such that second amount 212 of heat conducts through thermally insulative body 204 towards structural component 202. Alternatively, second amount 212 of heat may reach second surface 208 through gaps (not shown) in thermally insulative body 204, and/or movement of thermally insulative body 204 relative to structural component 202. Layer 214 of thermochromatic material is responsive to the amount of heat that reaches second surface 208 and facilitates determining degradation of thermally insulative body 204 as a result thereof.

In an exemplary implementation, a value of a thermochromatic property of layer 214 is only modified to a different level when a temperature of layer 214 is greater than a predetermined threshold. For example, the thermochromatic property across layer 214 has a substantially uniform baseline value when the temperature of layer 214 is below the predetermined threshold, and the value of the thermochromatic property is permanently modified to be at a different level when the temperature of layer 214 is greater than the predetermined threshold. More specifically, the value of the thermochromatic property is modified to the different level, and the value remains at the different level even after the temperature of layer 214 reduces to below the predetermined threshold. In one implementation, the value of the thermochromatic property is modified to a plurality of different levels as the temperature of layer 214 progressively increases above the predetermined threshold. As such, second amount 212 of heat that reaches second surface 208 can be determined based on which level the value has reached. The second amount 212 of heat may be directly proportional to an amount of degradation of thermally insulative body 204.

In some implementations, the value of the thermochromatic property is permanently modified such that thermal protection system 200 can be inspected at safe temperatures below the predetermined threshold. For example, to be inspected at predetermined service intervals, thermal protection system 200 is at least partially removed from structural component 202 such that layer 214 is exposed, and the value of the thermochromatic property of layer 214 is determined. More specifically, in one implementation, non-visible light (e.g., ultraviolet or infrared light) is directed towards exposed layer 214 and the photoluminescent material in layer 214 absorbs the non-visible light. Light is emitted from layer 214 at an intensity and/or frequency after the non-visible light has been removed. The value of the intensity and/or frequency of the emitted light is then compared to a baseline intensity and/or frequency value, and potential heat damage is located at second surface 208 when the value deviates from the baseline intensity and/or frequency value. For example, in one implementation, potential deviations from the baseline value are determined using image analysis software.

Figure 4:
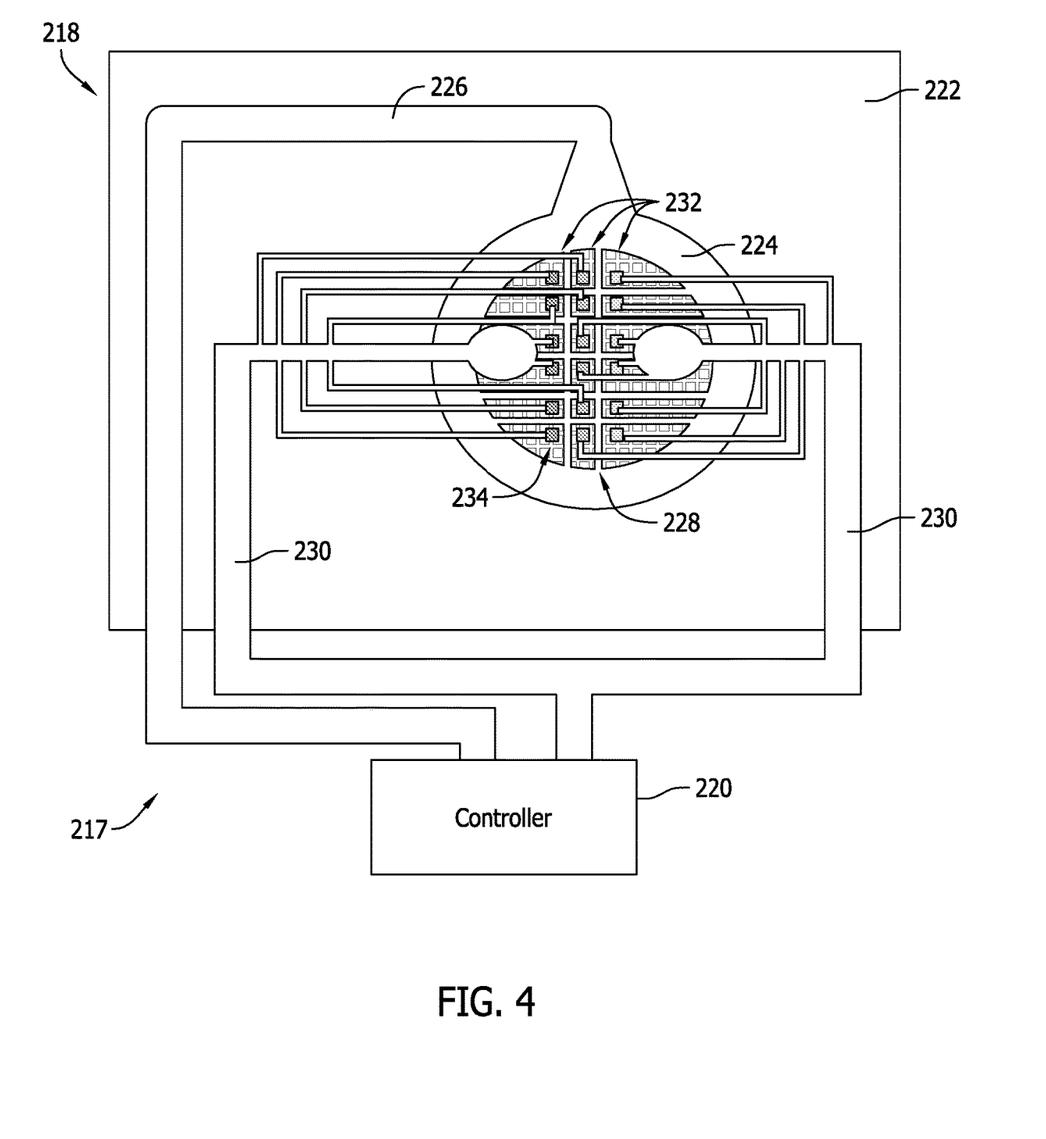
FIG. 4 is a schematic illustration of an exemplary monitoring system that may be used with the thermal protection system shown in FIG. 3.
Figure 5:
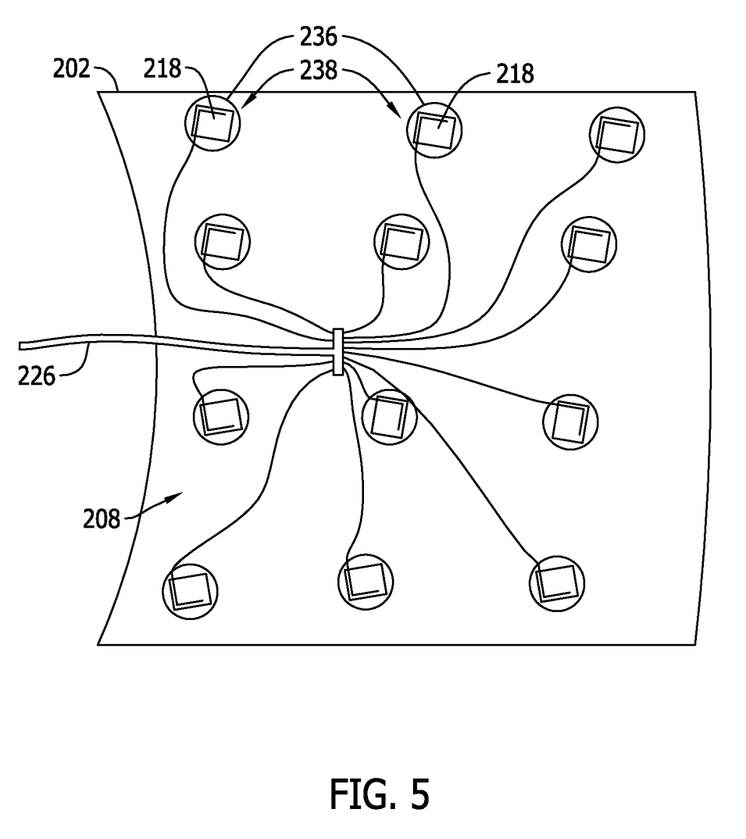
FIG. 5 is a schematic illustration of the thermal protection system shown in FIG. 3 utilizing the monitoring system shown in FIG. 4.

FIG. 4 is a schematic illustration of an exemplary monitoring system 217, and FIG. 5 is a schematic illustration of thermal protection system 200 utilizing the monitoring system 217. In the exemplary implementation, monitoring system 217 includes a micro-opto-electro-mechanical system (MOEMS) module 218 and a controller 220 coupled in communication with MOEMS module 218. MOEMS module 218 includes a substrate 222, an excitation source 224 coupled to substrate 222, a fiber laser excitation delivery system 226 in communication with excitation source 224, a detection system 228 coupled to substrate 222, and power/data delivery conduits 230 in communication with detection system 228. Excitation source 224 includes a light source such as a light-emitting diode (not shown), and detection system includes a plurality of light sensors 232 that each detect light in different spectral ranges. Moreover, in some implementations, MOEMS module 218 includes a filter 234, such as a color filter or a narrow bandwidth filter, that facilitates restricting frequencies of light received by detection system 228. In an alternative implementation, conduits 230 are omitted from MOEMS module 218 and signals received by detection system 228 are provided to controller 220 wirelessly.

Referring to FIG. 5, layer 214 includes a plurality of portions 236 each applied to a predetermined region 238 of thermally insulative body 204. Each predetermined region 238 corresponds to areas across second surface 208 known to be most susceptible to degradation. A plurality of modules (e.g., MOEMS modules 218) may be coupled to layer 214 at plurality of portions 236. For example, MOEMS modules 218 are coupled to each portion 236 of layer 214 such that a value of light emitted from each portion 236 can be determined. MOEMS modules 218 are coupled to layer 214 with an adhesive (not shown), for example, and are positioned between layer 214 and structural component 202 (shown in FIG. 3). In an alternative implementation, layer 214 may be applied across the entirety of second surface 208 and MOEMS modules 218 may be positioned at predetermined regions 238.

In operation, controller 220 directs excitation source 224 to selectively direct light towards layer 214 of thermochromatic material. Controller 220 substantially synchronizes operation of excitation source 224 and detection system 228 such that excitation source 224 only directs light towards layer 214 while detection system 228 is capturing data. Detection system 228 then receives a signal (not shown) emitted from layer 214, and controller 220 receives the signal. The signal includes the value of a thermochromatic property of layer 214. Controller 220 then compares the value to a baseline value of the thermochromatic property and determines degradation of thermally insulative body 204 when the value of the thermochromatic property deviates from the baseline value. As such, monitoring system 217 enables in-situ monitoring of thermal protection system 200 without having to remove thermally insulative body 204 from structural component 202.

Figure 6:
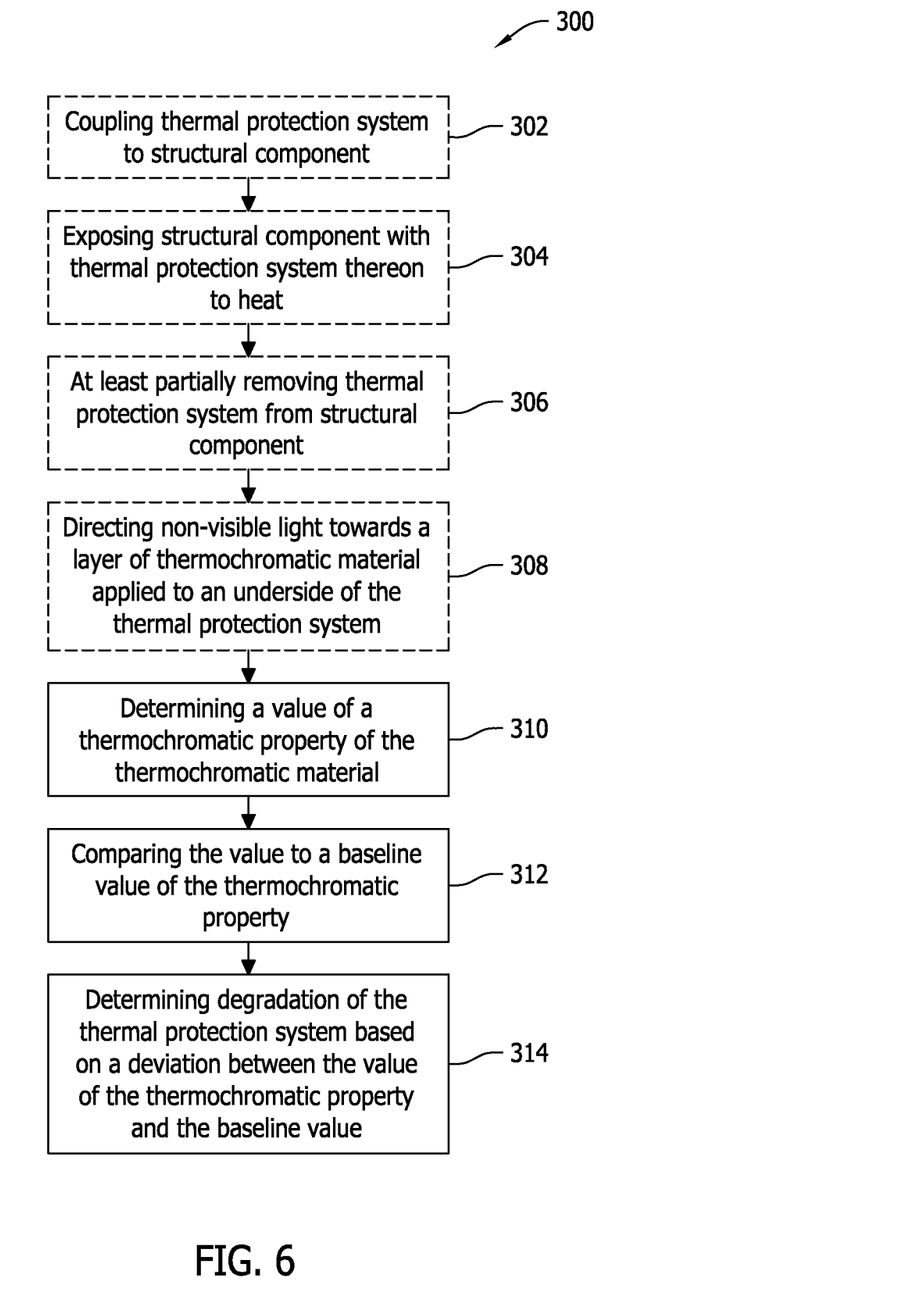
FIG. 6 is a flow diagram of an exemplary method of monitoring a thermal protection system that may be used with the thermal protection system shown in FIG. 3.

FIG. 6 is a flow diagram of an exemplary method 300 of monitoring a thermal protection system that may be used with thermal protection system 200 (shown in FIG. 3). In an exemplary implementation, method 300 includes coupling 302 thermal protection system 200 to structural component 202, exposing 304 structural component 202 with thermal protection system 200 thereon to heat, and at least partially removing 306 thermal protection system 200 from structural component 202. Non-visible light is then directed 308 towards layer 214 of thermochromatic material applied to an underside of thermal protection system 200. Method 300 also includes determining 310 a value of a thermochromatic property of the thermochromatic material, comparing 312 the value to a baseline value of the thermochromatic property, and determining 314 degradation of thermal protection system 200 based on a deviation between the value of the thermochromatic property and the baseline value.

The implementations described herein relate to systems and methods of monitoring thermal protection systems to facilitate detecting degradation thereof before damage to an underlying structural can occur. In the exemplary implementation, at least one layer of thermochromatic material is positioned between a thermally insulative body and the underlying structural. As the thermally insulative body degrades, the amount of heat conducted through the thermally insulative body towards the underlying structural increases. The layer of thermochromatic material facilitates detecting hot spots on the underside of the thermally insulative body by providing a visual indication at locations of potential degradation of the thermally insulative body. The thermochromatic material is selected to be selectively responsive to temperatures indicative of potential degradation, and is selected such that the visual indication remains even when the temperature of the layer returns to a safe inspection level. As such, the systems and methods described herein enable the structural integrity of the thermally insulative body to be determined in an efficient and cost-effective manner.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of monitoring a thermal protection system, the method comprising:
   accessing the thermal protection system coupled to a structural component, the thermal protection system including a thermally insulative body and at least one layer of thermochromatic material applied thereon, wherein the at least one layer is positioned between the thermally insulative body and the structural component;
   determining a value of a thermochromatic property of the at least one layer of thermochromatic material, wherein the value of the thermochromatic property includes at least one of an intensity or a frequency of light emitted from the at least one layer of thermochromatic material when exposed to non-visible light and is responsive to an amount of heat applied to the at least one layer of thermochromatic material, wherein the value of the thermochromatic property irreversibly changes based on the amount of heat applied;
   comparing the value to a baseline value of the thermochromatic property; and
   determining degradation of the thermal protection system when the value of the thermochromatic property deviates from the baseline value.

2. The method in accordance with claim 1, wherein determining a value comprises determining a plurality of values of the thermochromatic property, each of the plurality of values corresponding to a predetermined region of the at least one layer of thermochromatic material.

3. The method in accordance with claim 1 further comprising directing non-visible light towards the at least one layer of thermochromatic material, wherein the thermochromatic material includes photoluminescent material configured to be activated by the non-visible light.

4. The method in accordance with claim 3 further comprising at least partially removing the thermal protection system from the structural component to expose the at least one layer of thermochromatic material to the non-visible light.

5. The method in accordance with claim 1, wherein comparing the value comprises selecting the baseline value that corresponds to a temperature of the at least one layer below a predetermined threshold.

6. The method in accordance with claim 1 further comprising coupling the thermal protection system to the structural component.

7. The method in accordance with claim 1 further comprising coupling the thermal protection system to the structural component, the thermal protection system including the thermally insulative body that is fabricated from a plurality of heat-resistant fibers.

8. The method in accordance with claim 1 further comprising coupling the thermal protection system to the structural component, the thermal protection system including the thermally insulative body that is a woven or non-woven material formed of a plurality of heat-resistant fibers.

9. The method in accordance with claim 1 further comprising coupling the thermal protection system to the structural component, the thermal protection system including the thermochromatic material that is fabricated from one or more thermochromatic dyes responsive to temperatures above a predetermined threshold.

10. The method in accordance with claim 1 further comprising coupling the thermal protection system to the structural component, the thermal protection system including the at least one layer of thermochromatic material with a photoluminescent material.

11. The method in accordance with claim 1 further comprising coupling the thermal protection system to the structural component, the thermal protection system including the at least one layer of thermochromatic material with a plurality of portions each of which is applied to a predetermined region of the thermally insulative body.

12. The method in accordance with claim 1, wherein the thermally insulative body includes a first surface and a second surface, and the at least one layer of thermochromatic material is applied to the second surface, and
   wherein the method further comprises exposing the structural component with the thermal protection system to a first amount of heat, the thermally insulative body inhibiting heat transfer through the thermally insulative body from the first surface to the second surface so that only a second amount of heat reaches the second surface and thereby the at least one layer of thermochromatic material.

13. The method in accordance with claim 1 further comprising:
   at least partially removing the thermal protection system from the structural component; and
   directing non-visible light towards the at least one layer of thermochromatic material that includes a photoluminescent material that is activated by the non-visible light.

14. The method in accordance with claim 1, wherein determining the value of the thermochromatic property includes determining the value that is modified to a first level when a temperature of the at least one layer thermochromatic material is greater than a first predetermined threshold.

15. The method in accordance with claim 14, wherein determining the value of the thermochromatic property includes determining the value that remains at the first level when the temperature of the at least one layer thermochromatic material reduces to below the first predetermined threshold.

16. The method in accordance with claim 14, wherein determining the value of the thermochromatic property includes determining the value that is permanently modified to a second level as the temperature of the at least one layer thermochromatic material progressively increases above a second predetermined threshold.

17. The method in accordance with claim 1, wherein determining the value of the thermochromatic property includes determining the value that is substantially uniform across the at least one layer thermochromatic material when the temperature of the at least one layer is less than a predetermined threshold.

18. The method in accordance with claim 1, wherein determining the value of the thermochromatic property includes determining the value that irreversibly changes a plurality of different levels as a temperature of the at least one layer of thermochromatic material progressively increases above a predetermined threshold so that an amount of heat that reaches the at least one layer of thermochromatic material is determined based on which of the plurality of different levels the value has reached.

19. The method in accordance with claim 1, wherein determining the value of the thermochromatic property includes determining the value of the thermochromatic property that is only visible to a human eye when activated by non-visible light.

20. The method in accordance with claim 1, wherein the value of the thermochromatic property indicates the amount of heat applied to the at least one layer of thermochromatic material, and
  wherein determining the degradation of the thermal protection system includes determining the degradation that is directly proportional to the amount of heat.

* * * * *